Patented Aug. 22, 1933

1,923,464

UNITED STATES PATENT OFFICE 1,923,464

PROCESS OF MAKING DRY SODIUM ALUMINATE

Glenn H. Wagner, Belleville, Ill., assignor, by mesne assignments, to National Aluminate Corporation, Chicago, Ill., a Corporation of Delaware No Drawing. Application April 4, 1928
Serial No. 267,469

6 Claims. (Cl. 23—52)

The invention relates to the production in a highly concentrated form of sodium aluminate by means of a reaction between sodium hydroxide and aluminum hydrate.

The extended application and utilization of sodium aluminate has made necessary the development of commercial processes by which it may be economically manufactured. At present there are in operation processes which, by sintering or heating together aluminous material and an alkali substance, produce a dry sodium aluminate which is satisfactory for many purposes. Also processes have been proposed, and used, which comprise digesting dilute solutions of an alkali substance with bauxite or another impure aluminous material to form a solution of sodium aluminate which is subsequently treated to obtain the solid salt. The dry product obtained from these sources has found certain applications in the industry, and, within the limitations of its purity, has been generally satisfactory. However, such sodium aluminate contains an amount of insoluble impurities varying from about 3 to 15%, and many of the proposed uses for sodium aluminate, and particularly dry sodium aluminate, demand a product containing a minimum of insoluble impurities together with a maximum content of water soluble alumina. Particularly is this true when dry sodium aluminate is used in the textile, rayon and paper industries or in the purification of oil where insoluble impurities such as iron and grit are very objectionable. Also, in the treatment of boiler water where sodium aluminate has been found to have many advantages, the use of a chemical containing appreciable amounts of insoluble material is undesirable.

Furthermore, the prior wet processes for the production of sodium aluminate are objectionable, either because they require a large outlay for machinery and equipment, or because they inherently involve disadvantages of operation preventing proper control of conditions of procedure.

The object of this invention is to provide a simple and effective method of making dry sodium aluminate of high purity, which method is free from the prejudicial characteristics of prior methods, and is so flexible that it may be advantageously used for production on either a small or a large scale, and which may be practiced without a large outlay for equipment.

The invention is predicated upon my discovery that dry sodium aluminate containing less than 0.1% of water insoluble impurities, and having a ratio by weight of alumina to sodium hydroxide substantially equal to 0.9 to 1.1, may be made by heating together at an elevated temperature, not exceeding about that of the boiling point of the solution, a concentrated sodium hydroxide solution and aluminum hydrate.

In the practice of the invention a concentrated sodium hydroxide solution, preferably of commercial purity, is brought to an active boil in a suitable container, and to the solution maintained at atmospheric pressure there is added an aluminum hydrate, preferably of a high purity such as the product of the well known Bayer process. The aluminum hydrate dissolves rapidly, and the concentrations are so adjusted as to bring the solution to such a syrupy consistency that on pouring into a crystallizing pan it will set to a hard dense cake which is then heated to a temperature of about 300° to 450° C. for a suitable period of time. The resulting product contains about 55 to 60% of soluble alumina, and, when dissolved in cold water leaves an insoluble residue amounting to less than 0.1% of the total product.

I have found that in order to obtain the best results it is necessary to use a sodium hydroxide solution containing from about 600 to 800 grams per liter of sodium hydroxide. Such a solution, when brought to a boil, dissolves the aluminum hydrate rapidly. I have also found that the amount of aluminum hydrate to be added to such a solution must be so adjusted as to give a final product containing a ratio by weight of alumina to sodium hydroxide which is not widely divergent from 0.9 to 1.1. With substantially lower ratios the product is unsatisfactory and unstable, and consequently difficult to handle. I have found that when the ratio is substantially higher than 0.9 to 1.1 it is impossible to dissolve the product in water except in the presence of an excess of sodium hydroxide, and therefore such a product is not satisfactory.

The heating of the cake to a temperature of about 300° to 450° C. results in the stabilization and dehydration or calcination of the product. The calcined product does not absorb carbon dioxide from the air as easily as does the unheated product and is therefore more stable. While I have found that between the unheated and the calcined product there is practically no difference in solubility, nevertheless the calcined product dissolves more rapidly in cold water than does the uncalcined, which is a decided advantage in its use in the industries particularly where it must be handled in a dry form by means of mechanical feeding devices. Furthermore, the calcined product, because of its reduced weight, allows of lower shipping costs, less storage space and fewer containers.

As an example of the preferred manner in which my invention may be practiced, a concentrated aqueous solution of sodium hydroxide containing 752 grams of sodium hydroxide per liter was brought to an active boil and aluminum hydrate was added slowly until the ratio of $Al_2O_3$ to NaOH was equal approximately to 1. After a short boiling the solution became cloudy and when poured into a crystallizing pan or receiver it set to a hard cake which was completely soluble in cold distilled water. After this cake was placed in a suitable furnace and heated at 350° C. for approximately 12 hours, it was found that the calcined product was completely soluble in cold distilled water and contained 56.34% of soluble $Al_2O_3$.

As another example, aluminum hydrate was added to a boiling solution containing 752 grams per liter of NaOH until the ratio of $Al_2O_3$ to NaOH was equal to approximately 1. After a short time the solution became cloudy and was poured. After the resulting cake had been heated for 1 hour at 400° C., it was found that the calcined product contained 56.1% of soluble $Al_2O_3$, and that when dissolved in cold distilled water showed an insoluble residue of 0.06%.

Among the numerous and readily apparent advantages of this process, it is noted that it is easily carried out, that its practice does not necessitate an expensive outlay for equipment such as is not readily available in a chemical plant, and that it does not require the attention of skilled labor. Furthermore, the process is flexible, its operation on a small or large scale being merely a question of multiplicity of simple equipment. The chemically pure product which is obtained is dense and is of a white color, and the calcined product is relatively stable.

According to the provisions of the patent statutes, I have explained the principle and mode of operation of my invention, and have given specific examples of how it may be practiced. However, I desire to have it understood that, within the scope of the appended claims, the invention may be practiced otherwise than as specifically described.

I claim as my invention:

1. The process of making dry sodium aluminate containing less than about 0.1 per cent of water-insoluble impurities comprising heating at an elevated temperature not exceeding about that of the boiling point of the solution a concentrated solution of sodium hydroxide with aluminum hydrate in such an amount as to provide a ratio of alumina to sodium hydroxide in the solution of about 0.9 to 1.1, and congealing the reaction mass.

2. The process of making dry sodium aluminate containing less than about 0.1 per cent of water-insoluble impurities comprising heating at an elevated temperature not exceeding about that of the boiling point of the solution a concentrated solution of sodium hydroxide, containing from about 600 to 800 grams per liter of sodium hydroxide, with aluminum hydrate in such an amount as to provide a ratio of alumina to sodium hydroxide in the solution of about 0.9 to 1.1, and congealing the reaction mass.

3. The process of making dry sodium aluminate containing less than about 0.1 per cent of water-insoluble impurities comprising heating at an elevated temperature not exceeding about that of the boiling point of the solution a concentrated solution of sodium hydroxide with aluminum hydrate in such an amount as to provide a ratio of alumina to sodium hydroxide in the solution of about 0.9 to 1.1, congealing the reaction mass, and dehydrating the congealed mass by heating at an elevated temperature.

4. The process of making dry sodium aluminate containing less than about 0.1 per cent of water-insoluble impurities comprising heating at an elevated temperature not exceeding about that of the boiling point of the solution a concentrated solution of sodium hydroxide, containing from about 600 to 800 grams per liter of sodium hydroxide, with aluminum hydrate in an amount such as to provide a ratio of alumina to sodium hydroxide in the solution of about 0.9 to 1.1, congealing the reaction mass, and dehydrating the congealed mass by heating at an elevated temperature.

5. A process of making dry sodium aluminate containing less than about 0.1 percent of water-insoluble impurities, comprising heating at an elevated temperature not exceeding about that of the boiling point of the solution, a concentrated solution of sodium hydroxide with aluminum hydrate in an amount sufficient to produce a solution of syrupy consistency which will set to a dense hard cake when poured into a crystallizing receptacle, and pouring said solution into a receptacle to congeal the reaction mass and produce a cake of said dry sodium aluminate.

6. A process of making dry sodium aluminate containing less than about 0.1 percent of water-insoluble impurities, comprising heating at an elevated temperature not exceeding about that of the boiling point of the solution, a solution of sodium hydroxide containing between about 600 to 800 grams of NaOH per liter, adding aluminum hydrate to the solution in an amount sufficient to form a syrupy solution which will congeal to a dense, hard mass upon being poured into a crystallizing receptacle, and pouring the solution into a receptacle to congeal the reaction mass and form a cake of said dry sodium aluminate.

GLENN H. WAGNER.